(12) United States Patent
Berkman (10) Patent No.: US 7,856,032 B2
(45) Date of Patent: Dec. 21, 2010

(54) MULTI-FUNCTION MODEM DEVICE

(75) Inventor: William H. Berkman, New York, NY (US)

(73) Assignee: Current Technologies, LLC, Germantown, MD (US)

( * ) Notice: Subject to any disclaimer, the term of this patent is extended or adjusted under 35 U.S.C. 154(b) by 744 days.

(21) Appl. No.: 11/097,286

(22) Filed: Apr. 4, 2005

(65) Prior Publication Data

US 2006/0221995 A1    Oct. 5, 2006

(51) Int. Cl.
*H04L 12/66* (2006.01)
(52) U.S. Cl. .................. 370/463; 370/465
(58) Field of Classification Search .......... 370/254, 370/464, 277, 485, 475, 487, 465, 351, 241; 455/550, 402, 434, 426, 422; 340/310, 870; 702/62; 709/229; 379/413; 725/82, 78, 725/79
See application file for complete search history.

(56) References Cited

U.S. PATENT DOCUMENTS

| | | | |
|---|---|---|---|
| 3,369,078 A | 2/1968 | Stradley | |
| 3,810,096 A | 5/1974 | Kabat et al. | |
| 3,911,415 A | 10/1975 | Whyte | |
| 3,942,168 A | 3/1976 | Whyte | |
| 3,942,170 A | 3/1976 | Whyte | |
| 3,944,723 A | 3/1976 | Fong | |
| 3,964,048 A | 6/1976 | Lusk et al. | |
| 3,967,264 A | 6/1976 | Whyte et al. | |
| 3,973,087 A | 8/1976 | Fong | |
| 3,973,240 A | 8/1976 | Fong | |
| 4,004,110 A | 1/1977 | Whyte | |
| 4,057,793 A | 11/1977 | Johnson et al. | |
| 4,060,735 A | 11/1977 | Pascucci et al. | |
| 4,239,940 A | 12/1980 | Dorfman | |
| 4,250,489 A | 2/1981 | Dudash et al. | |
| 4,475,209 A | 10/1984 | Udren | |
| 4,599,598 A | 7/1986 | Komoda et al. | |
| 4,638,298 A | 1/1987 | Spiro | |
| 4,642,607 A | 2/1987 | Strom et al. | |
| 5,066,939 A | 11/1991 | Mansfield, Jr. | |
| 5,257,006 A | 10/1993 | Graham et al. | |
| 5,319,634 A | 6/1994 | Bartholomew et al. | |
| 5,726,980 A | 3/1998 | Rickard | |
| 5,818,821 A | 10/1998 | Schurig | |

(Continued)

FOREIGN PATENT DOCUMENTS

EP    1 251 646 A2    10/2002

(Continued)

OTHER PUBLICATIONS

"Centralized Commercial Building Applications with the Lonworks® PLT-21 Power Line Transceiver", *Lonworks Engineering Bulletin*, Echelon, (Apr. 1997),1-22.

(Continued)

*Primary Examiner*—Kwang B Yao
*Assistant Examiner*—Syed Bokhari
(74) *Attorney, Agent, or Firm*—Mel Barnes; Capital Legal Group, LLC (57) ABSTRACT

A communications device including a port that is capable of communicating with a user device, a controller connected to the port, a power line modem connected to the controller, and a network modem connected to the controller.

39 Claims, 7 Drawing Sheets

U.S. PATENT DOCUMENTS

| | | | |
|---|---|---|---|
| 5,870,016 A | 2/1999 | Shresthe | |
| 5,929,748 A | 7/1999 | Odinak | |
| 5,949,327 A | 9/1999 | Brown | |
| 5,978,371 A | 11/1999 | Mason, Jr. et al. | |
| 6,151,480 A | 11/2000 | Fischer et al. | |
| 6,160,795 A | 12/2000 | Hosemann | |
| 6,346,875 B1 | 2/2002 | Puckette et al. | |
| 6,373,377 B1 | 4/2002 | Sacca et al. | |
| 6,417,762 B1 | 7/2002 | Comer | |
| 6,522,650 B1 | 2/2003 | Yonge, III et al. | |
| 6,526,581 B1 | 2/2003 | Edson | |
| 6,587,739 B1 | 7/2003 | Abrams et al. | |
| 6,624,532 B1 | 9/2003 | Davidow | |
| 6,687,574 B2 | 2/2004 | Pietrowicz et al. | |
| 6,771,775 B1 | 8/2004 | Widmer | |
| 6,778,817 B1 | 8/2004 | Bullock et al. | |
| 6,842,459 B1 | 1/2005 | Binder | |
| 6,844,809 B2* | 1/2005 | Manis et al. | 370/465 |
| 6,885,674 B2 | 4/2005 | Hunt et al. | |
| 6,952,159 B1 | 10/2005 | Muller | |
| 6,956,464 B2 | 10/2005 | Wang et al. | |
| 6,961,303 B1 | 11/2005 | Binder | |
| 6,965,303 B2 | 11/2005 | Mollenkopf | |
| 6,975,212 B2 | 12/2005 | Crenshaw et al. | |
| 6,977,578 B2 | 12/2005 | Kline | |
| 6,980,091 B2 | 12/2005 | White et al. | |
| 6,993,317 B2 | 1/2006 | Belsak, Jr. | |
| 6,998,962 B2 | 2/2006 | Cope et al. | |
| 7,224,272 B2 | 5/2007 | White et al. | |
| 7,269,403 B1* | 9/2007 | Miao | 455/402 |
| 7,308,103 B2 | 12/2007 | Corcoran et al. | |
| 7,554,459 B2* | 6/2009 | Giubbini | 340/870.02 |
| 2002/0109585 A1 | 8/2002 | Sanderson | |
| 2002/0186699 A1 | 12/2002 | Kwok | |
| 2003/0050737 A1 | 3/2003 | Osann, Jr. | |
| 2003/0052770 A1 | 3/2003 | Mansfield, Jr. et al. | |
| 2003/0062990 A1 | 4/2003 | Schaeffer, Jr. et al. | |
| 2003/0068033 A1* | 4/2003 | Kiko | 379/413 |
| 2003/0071719 A1 | 4/2003 | Crenshaw et al. | |
| 2003/0097452 A1* | 5/2003 | Kim et al. | 709/229 |
| 2003/0100288 A1* | 5/2003 | Tomlinson et al. | 455/402 |
| 2003/0101459 A1* | 5/2003 | Edson | 725/82 |
| 2003/0103307 A1 | 6/2003 | Dostert | |
| 2003/0106067 A1 | 6/2003 | Hoskins et al. | |
| 2003/0129978 A1* | 7/2003 | Akiyama et al. | 455/426 |
| 2003/0158677 A1* | 8/2003 | Swarztrauber et al. | 702/62 |
| 2003/0184433 A1* | 10/2003 | Zalitzky et al. | 340/310.06 |
| 2003/0224784 A1 | 12/2003 | Hunt et al. | |
| 2003/0226149 A1* | 12/2003 | Chun et al. | 725/78 |
| 2004/0066283 A1* | 4/2004 | Manis et al. | 340/310.01 |
| 2004/0067745 A1 | 4/2004 | Belsak | |
| 2004/0090312 A1 | 5/2004 | Manis et al. | |
| 2004/0110483 A1 | 6/2004 | Mollenkopf | |
| 2004/0135676 A1 | 7/2004 | Berkman et al. | |
| 2004/0157551 A1 | 8/2004 | Gainey et al. | |
| 2004/0163128 A1 | 8/2004 | Phillips et al. | |
| 2004/0168199 A1 | 8/2004 | Phillips et al. | |
| 2004/0178888 A1 | 9/2004 | Hales et al. | |
| 2004/0196144 A1 | 10/2004 | Crenshaw et al. | |
| 2004/0227623 A1 | 11/2004 | Pozsgay | |
| 2004/0233928 A1 | 11/2004 | Pozsgay | |
| 2004/0242185 A1 | 12/2004 | Lee | |
| 2005/0015805 A1* | 1/2005 | Iwamura | 725/79 |
| 2005/0033534 A1 | 2/2005 | Villicana et al. | |
| 2005/0040809 A1 | 2/2005 | Uber et al. | |
| 2005/0046550 A1 | 3/2005 | Crenshaw et al. | |
| 2005/0068223 A1 | 3/2005 | Vavik | |
| 2005/0101312 A1* | 5/2005 | Kang | 455/422.1 |
| 2005/0128057 A1 | 6/2005 | Mansfield et al. | |
| 2005/0129097 A1 | 6/2005 | Strumpf et al. | |
| 2005/0164666 A1 | 7/2005 | Lang et al. | |
| 2005/0168326 A1 | 8/2005 | White et al. | |
| 2005/0200459 A1 | 9/2005 | White | |
| 2005/0212688 A1* | 9/2005 | Chung | 340/870.02 |
| 2005/0220004 A1 | 10/2005 | Vollmer et al. | |
| 2005/0249245 A1 | 11/2005 | Hazani et al. | |
| 2005/0273282 A1 | 12/2005 | Mollenkopf | |
| 2005/0285720 A1 | 12/2005 | Cope et al. | |
| 2006/0002189 A1* | 1/2006 | Berkman | 365/185.2 |
| 2006/0017324 A1 | 1/2006 | Pace et al. | |
| 2006/0034330 A1 | 2/2006 | Iwamura | |
| 2006/0038660 A1 | 2/2006 | Doumuki et al. | |
| 2006/0044076 A1 | 3/2006 | Law | |
| 2006/0045105 A1 | 3/2006 | Dobosz et al. | |
| 2006/0049693 A1 | 3/2006 | Abraham et al. | |
| 2006/0050642 A1* | 3/2006 | Chini et al. | 370/241 |
| 2006/0072695 A1 | 4/2006 | Iwamura | |
| 2006/0073805 A1 | 4/2006 | Zumkeller et al. | |
| 2006/0077906 A1* | 4/2006 | Maegawa et al. | 370/254 |
| 2006/0079198 A1 | 4/2006 | Sanderson | |
| 2006/0079230 A1* | 4/2006 | Russell | 455/434 |
| 2006/0097573 A1* | 5/2006 | Gidge et al. | 307/3 |
| 2006/0132299 A1 | 6/2006 | Mansfield et al. | |
| 2006/0140260 A1* | 6/2006 | Wasaki et al. | 375/219 |
| 2006/0165054 A1 | 7/2006 | Iwamura | |
| 2006/0187023 A1 | 8/2006 | Iwamura | |
| 2006/0251179 A1 | 11/2006 | Ghoshal | |
| 2006/0291575 A1 | 12/2006 | Berkman et al. | |
| 2007/0183447 A1 | 8/2007 | Binder | |
| 2007/0201494 A1 | 8/2007 | Lou et al. | |
| 2008/0037784 A1 | 2/2008 | Corcoran et al. | |
| 2009/0040030 A1 | 2/2009 | Mathews et al. | |

FOREIGN PATENT DOCUMENTS

| | | |
|---|---|---|
| GB | 2 293 950 A | 4/1996 |
| JP | 10200544 A2 | 7/1998 |
| WO | WO-03/030396 A2 | 4/2003 |
| WO | WO 2004102868 | 11/2004 |

OTHER PUBLICATIONS

"Demand Side Management with Lonworks® Power Line Transceivers", *Lonworks Engineering Bulletin*, (Dec. 1996),1-36.

"EMETCON Automated Distribution System: Communications Guide", *Westinghouse ABB Power T & D Company Technical Manual 42-6001A,*, (Sep. 1989),1-55.

"Outlook Conference 2004: Amperion Deployment Overview", *Primen Conference*, (May 7, 2004),1-10.

Hawkins, Bob, "Sault Ste. Marie, Canada's First Working BPL Installation", La Revuw des Radioamateurs Canadiens,(Jul. & Aug. 2004),1-4.

Horiguchi, Akira, "High Speed Power Line Communication Technology", *Mitsubishi Electric Advance* vol. 109, (Mar. 2005),1-27.

* cited by examiner

MULTI-FUNCTION MODEM DEVICE

FIELD OF THE INVENTION

The present invention generally relates to data and voice communications over a power distribution system and more particularly, to devices, systems, and methods for providing multiple or backup network connections to the internet or other network using a power line communication system.

BACKGROUND OF THE INVENTION

Well-established power distribution systems exist throughout most of the United States, and other countries, which provide power to customers via power lines. With some modification, the infrastructure of the existing power distribution systems can be used to provide data communication in addition to power delivery, thereby forming a power line communication system (PLCS). In other words, existing power lines, that already have been run to many homes and offices, can be used to carry data signals to and from the homes and offices. These data signals are communicated on and off the power lines at various points in the power line communication system, such as, for example, near homes, offices, Internet service providers, and the like.

Power distribution systems include numerous sections, which transmit power at different voltages. The transition from one section to another typically is accomplished with a transformer. The sections of the power distribution system that are connected to the customers premises typically are low voltage (LV) sections having a voltage between 100 volts (V) and 200V, depending on the system. In the United States, the LV section typically is about 120V. The sections of the power distribution system that provide the power to the LV sections are referred to as the medium voltage (MV) sections. The voltage of the MV section is in the range of 1,000V to 100,000V. The transition from the MV section to the LV section of the power distribution system typically is accomplished with a distribution transformer, which converts the higher voltage of the MV section to the lower voltage of the LV section.

In one example PLCS embodiment, a backhaul point forms the gateway between the power line and conventional telecommunications medium and communicates with a plurality of downstream communication devices such as transformer bypass devices. The backhaul point and its plurality of communication devices (and their associated user devices) form a PLCS subnet.

In a PLCS the low voltage power line typically has the highest noise and interference that limits the amount of data that can be transmitted over the low voltage power line. This problem is more acute when multiple users are all sharing the same low voltage power line subnet. Therefore, there remains a need to prove additional and alternate bandwidth capability to a user of a PLCS. Further, the users of other types of broadband systems may have service outages. For example, if a user has a DSL connection that has an outage, the user is unable to communicate with the internet or other external network. For many users such an outage may result in various detrimental effects such as work stoppage, loss of E-mail capability, etc. Therefore there remains a need for a backup capability in the case of such outages.

SUMMARY OF THE INVENTION

The present invention includes a PLCS that provides a backup broadband network connection to the user of a non-PLCS broadband network. Further, the present invention includes devices, systems, and methods for providing multiple (or backup) network connections to the internet using a power line communication system. One embodiment of the present invention may include a communications device including a port that is capable of communicating with a user device, a controller connected to the port, a power line modem connected to the controller, and a network modem connected to the controller.

BRIEF DESCRIPTION OF THE DRAWINGS

The invention is further described in the detailed description that follows, by reference to the noted drawings by way of non-limiting illustrative embodiments of the invention, in which like reference numerals represent similar parts throughout the drawings. As should be understood, however, the invention is not limited to the precise arrangements and instrumentalities shown. In the drawings.

DETAILED DESCRIPTION OF ILLUSTRATIVE EMBODIMENTS

In the following description, for purposes of explanation and not limitation, specific details are set forth, such as particular networks, communication systems, computers, terminals, devices, components, techniques, data and network protocols, PLCSs, software products and systems, operating systems, development interfaces, hardware, etc. in order to provide a thorough understanding of the present invention.

However, it will be apparent to one skilled in the art that the present invention may be practiced in other embodiments that depart from these specific details. Detailed descriptions of well-known networks, communication systems, computers, terminals, devices, components, techniques, data and network protocols, PLCSs, software products and systems, operating systems, development interfaces, and hardware are omitted so as not to obscure the description of the present invention.

Figure 1:
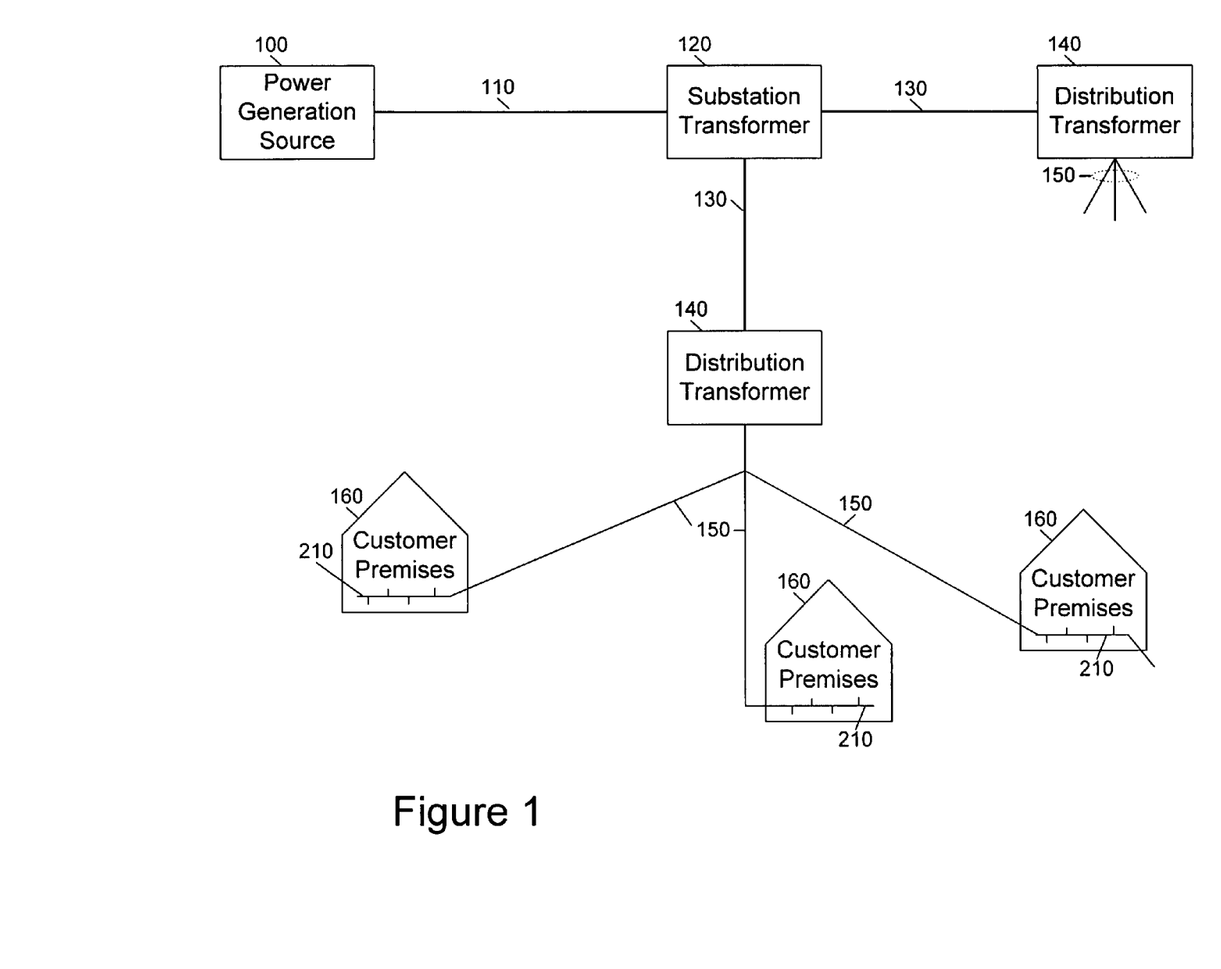
FIG. 1 illustrates an example power distribution system where the present invention may be employed.

FIG. 1 illustrates an example power distribution systems that includes components for power generation 100, power transmission 110, and power delivery 130, 150. A power generation source 100 generates a voltage and a transmission substation increases this voltage to high voltage (HV) levels for long distance transmission on HV transmission lines 110 to a substation transformer 120. Typical voltages found on HV transmission lines 110 range from 69 kilovolts (kV) to in excess of 800 kV.

In addition to HV transmission lines 110, power distribution systems include medium voltage (MV) power lines 130 and low voltage (LV) power lines 150. As discussed, MV typically ranges from about 1000 V to about 100 kV, and LV typically ranges from about 100 V to about 200 V. Transformers are used to convert between the respective voltage portions, e.g., between the HV section and the MV section and between the MV section and the LV section. Transformers have a primary side for connection to a first voltage (e.g., the MV section) and a secondary side for outputting another (usually lower) voltage (e.g., the LV section). Such transformers are often referred to as distribution transformers or a step down transformers, because they "step down" the voltage to some lower voltage. Transformers, therefore, provide voltage conversion for the power distribution system. Thus, power is carried from a substation transformer 120 to a distribution transformer 140 over one or more MV power lines 130. Power is carried from the distribution transformer 140 to the customer premises via one or more LV power lines 150.

In addition, a distribution transformer 140 may function to distribute one, two, three, or more phase power signals to the customer premises 160, depending upon the demands of the user. In the United States, for example, these local distribution transformers typically feed anywhere from one to ten homes, depending upon the concentration of the customer premises in a particular area. Distribution transformers 140 may be pole-top transformers located on a utility pole, pad-mounted transformers located on the ground, or transformers located under ground level. As is known to those skilled in the art, distribution transformers in overhead power lines tap off power from the MV power lines and are in parallel with the MV power line conductors. In contrast, in most URD systems the distribution transformer is in series with the MV conductor. Specifically, in a URD system a first MV cable and a second MV cable plug into the distribution transformer and are connected together by a conductor inside the transformer housing that is also connected to one end of the transformer's primary winding.

The following brief description provides one example PLCS with which the present invention may be used. Other types of PLCS may be used with the present invention as well.

Figure 2:
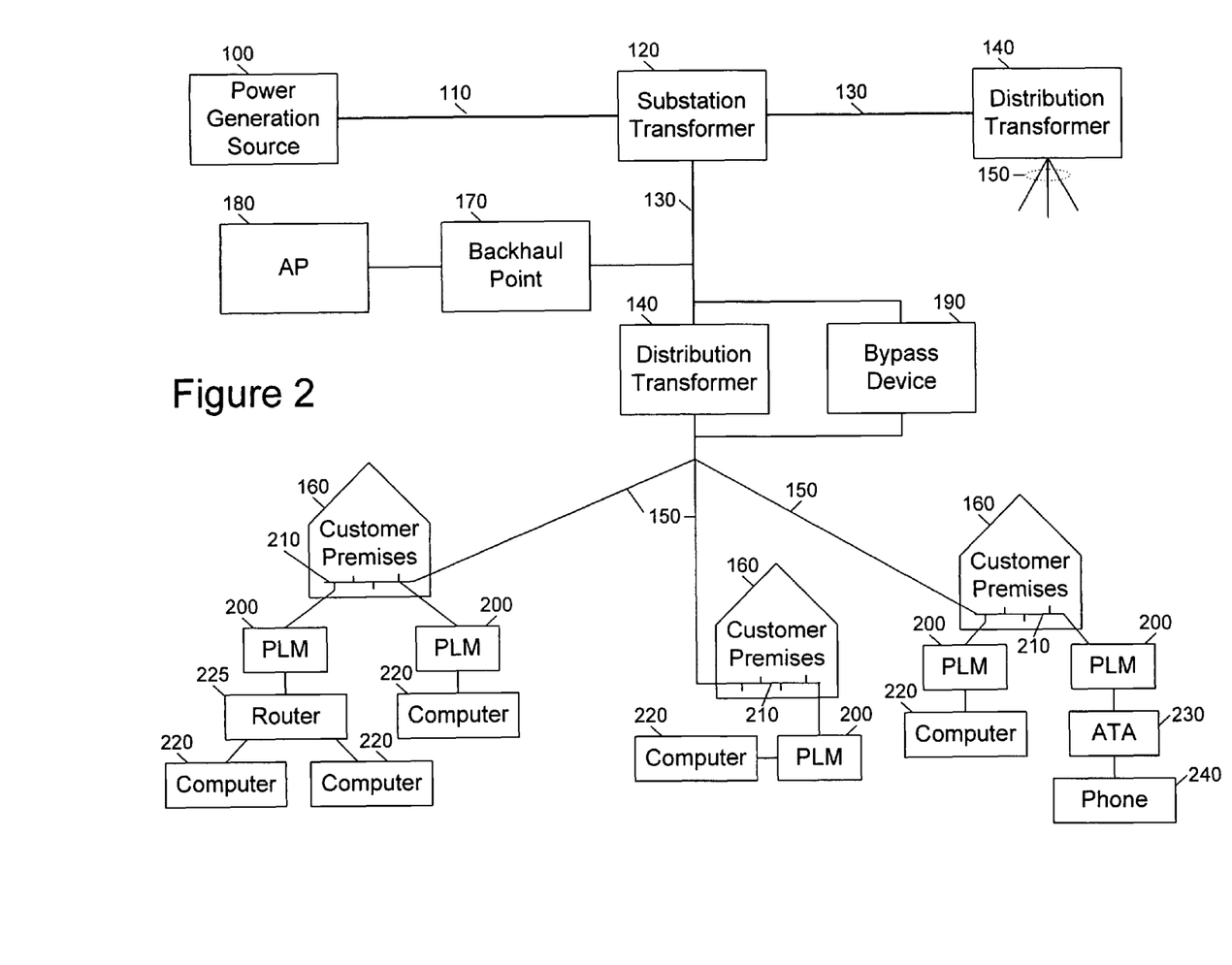
FIG. 2 illustrates an example of a power line communication system that may be used with the present invention.

An example PLCS is shown in FIG. 2 that includes one or more network elements (NE) or communications devices, which may include transformer bypass devices (BD) 190 and back haul points (BP) 170. A PLCS subnet may be defined as the part of a PLCS served by a single backhaul point 170.

In this illustration, only one bypass device 190 is depicted. However, in practice five, ten, or more bypass devices 190 may form part of a single PLCS subnet. The bypass device 190 is the gateway between the LV power line subnet (i.e., the LV power lines 150 and the devices that are communicatively coupled to the LV power lines 150) and the MV power line 130. The bypass device 190 may provide communications services for user computers 220 or other devices at customer premises 160, which services may include security management, routing of Internet protocol (IP) packets, filtering data, access control, service level monitoring, signal processing and modulation/demodulation of signals transmitted over the power lines.

In this example PLCS, the PLCS subnet also includes a backhaul point 170. The backhaul point 170 is an interface and gateway between the MV power line 130 and a non-power line telecommunications network. One or more backhaul points 170 typically are communicatively coupled to an aggregation point (AP) 180 to the Internet. The backhaul point 170 may be connected to the AP 180 using any available mechanism, including fiber optic conductors, T-carrier, Synchronous Optical Network (SONET), or wireless techniques. Thus, the backhaul point 170 includes a transceiver suited for communicating through the non-power line telecommunications medium (hereinafter the "backhaul link"). The backhaul point 170 is also coupled to the MV power line 130 to communicate to the one or more bypass devices 190 via the MV power line 130.

The AP 180 may include a conventional Internet Protocol (IP) data packet router and typically is connected to an Internet backbone thereby providing access to the Internet. Also, the AP 180 may be connected to a point of presence (POP) that provides access to the Internet or other communication network, and the POP and the AP 180 may be co-located. Alternatively, the AP 180 may be connected to a core router (not shown), which provides access to the Internet or other communication network. Depending on the configuration of the PLCS, a plurality of APs 180 may be connected to a single core router which provides Internet access. The core router may route voice traffic to and from a voice telephone service provider (TSP) and route Internet traffic to and from an Internet service provider. The routing of packets to the appropriate provider may be determined by any suitable means such as by including information in the data packets to determine whether a packet is voice.

In some PLCS embodiments, there may be a distribution point (not shown) between the backhaul point 170 and the AP 180. The distribution point, which may comprise a router, may be coupled to a plurality of backhaul points 170 and provides routing functions between its backhaul points 170 and its AP 180. In one example embodiment, a plurality of backhaul points 170 are connected to each distribution point and each distribution point (of which there is a plurality) is coupled to the AP 180, which provides access to the Internet and other networks.

Other types of NEs that may be found in the PLCS but not shown in FIG. 2, are LV and MV repeaters. These devices are found on power lines and receive and repeat the communication signals found on the power lines to extend the range of communications.

The PLCS also may include a power line server (PLS) that is a computer system with memory for storing a database of information about the PLCS and includes a network element manager (NEM) that monitors and controls the PLCS. The PLS allows network operations personnel to provision users and network equipment, manage customer data, and monitor system status, performance and usage. The PLS may reside at a remote operations center to oversee a group of NEs via the Internet. The PLS may provide an Internet identity to the NE by assigning the devices (e.g., user devices, bypass devices 190, (e.g., the LV modems and MV modems of bypass devices), LV and MV repeaters, backhaul points 170, and AP 180) an IP address and storing the IP address and other device identifying information (e.g., the device's location, address, serial number, etc.) in its memory. In addition, the PLS may approve or deny user devices authorization requests, command status reports and measurements from the NEs, and provide application software upgrades to the NEs. The PLS, by collecting electric power distribution information and interfacing with utilities' back-end computer systems may provide enhanced distribution services such as automated meter reading, outage detection, restoration detection, load balancing, distribution automation, Volt/Volt-Amp Reactance (Volt/VAr) management, and other similar functions. The PLS also may be connected to one or more APs 180 and/or core routers directly or through the Internet and therefore can communicate with any of the bypass devices 190, repeaters, user devices, backhaul points 170 and other network elements through the respective AP 180 and/or core router.

At the user end of the PLCS, data flow originates from a user device, which provides the data to a power line modem (PLM) 200, which is well-known in the art. Various electrical circuits 210 within the customer's premises 160 distribute power and data signals within the customer premises 160. The customer draws power on demand by plugging a device into a power outlet. In a similar manner, the customer may plug the PLM 200 into a power outlet to digitally connect user devices to communicate data signals carried by the power wiring. The PLM 200 thus serves as an interface for user devices to access the PLCS. The PLM 200 may have a variety of interfaces for customer data appliances. For example, a PLM 200 may include a RJ-11 Plain Old Telephone Service (POTS) connector, an RS-232 connector, a USB connector, a 10 Base-T connector, RJ-45 connector, and the like. In this manner, a customer may connect a variety of user devices to the PLCS. Further, multiple PLMs 200 may be plugged into power outlets throughout the customer premises 160, with each PLM 200 communicating over the same wiring 210 internal to the customer premises 160.

The PLM 200 may be connected to (or integrated into) any device capable of supplying data for transmission (or for receiving such data) including, but not limited to a computer 220, a router 225, a telephone 240, a telephone answering machine, an analog telephone adaptor 230 (ATA), a fax, a digital cable box (e.g., for processing digital audio and video, which may then be supplied to a conventional television and for transmitting requests for video programming), a video game, a stereo, a videophone, a television (which may be a digital television), a video recording device, a home network device, a utility meter, or other device. The PLM 200 transmits the data received form the user device through the customer LV power line 150 to a bypass device 190 and provides data received from the LV power line 150 to the user device. The PLM 200 may also be integrated with the user device, which may be a computer, stereo, audio/video presentation device, or audio/video storage device. In addition, the functions of the PLM 200 may be integrated into a smart utility meter such as a gas meter, electric meter, water meter, or other utility meter to thereby provide automated meter reading (AMR).

The bypass device 190 typically transmits the data to the backhaul point 170, which, in turn, transmits the data to the AP 180. The AP 180 then transmits the data to the appropriate destination (perhaps via a core router), which may be a network destination (such as an Internet address) in which case the packets are transmitted to, and pass through, numerous routers (herein routers are meant to include both network routers and switches) in order to arrive at the desired destination.

The backhaul point 170 may be coupled to each phase of the MV power line 130. In practice, however, this may not be necessary. In some embodiments, such as those communicating through overhead MV conductors, data signals may couple across the MV conductors. In other words, data signals transmitted on one MV phase conductor may be present on all of the MV phase conductors due to the data signal coupling between the conductors. As a result, the backhaul point 170 may not need to be physically connected to all three phase conductors of the MV power lines 130 and transmission from the backhaul point 170 when coupled to one MV phase conductor will be received by the bypass devices 190 connected to the other MV phase conductors and vice versa. In some embodiments, however, which may include underground MV cables, it may be desirable to couple the backhaul point 170 to all of the available phase conductors.

A detailed description of an example PLCS, its components and features is provided in U.S. patent application Ser. No. 10/641,689 filed Aug. 14, 2003, entitled "Power Line Communication System and Method of Operating the Same," which is hereby incorporated by reference in its entirety. A detailed description of another example PLCS, its components and features is provided in U.S. patent application Ser. No. 10/973,493 filed Oct. 26, 2004, entitled "Power Line Communications System and Method of Operating the Same," which is hereby incorporated by reference in its entirety. The present invention may be used with networks as described in the above patent applications or others. Thus, the invention is not limited to a particular PLCS, PLCS architecture, or topology.

Figure 3:
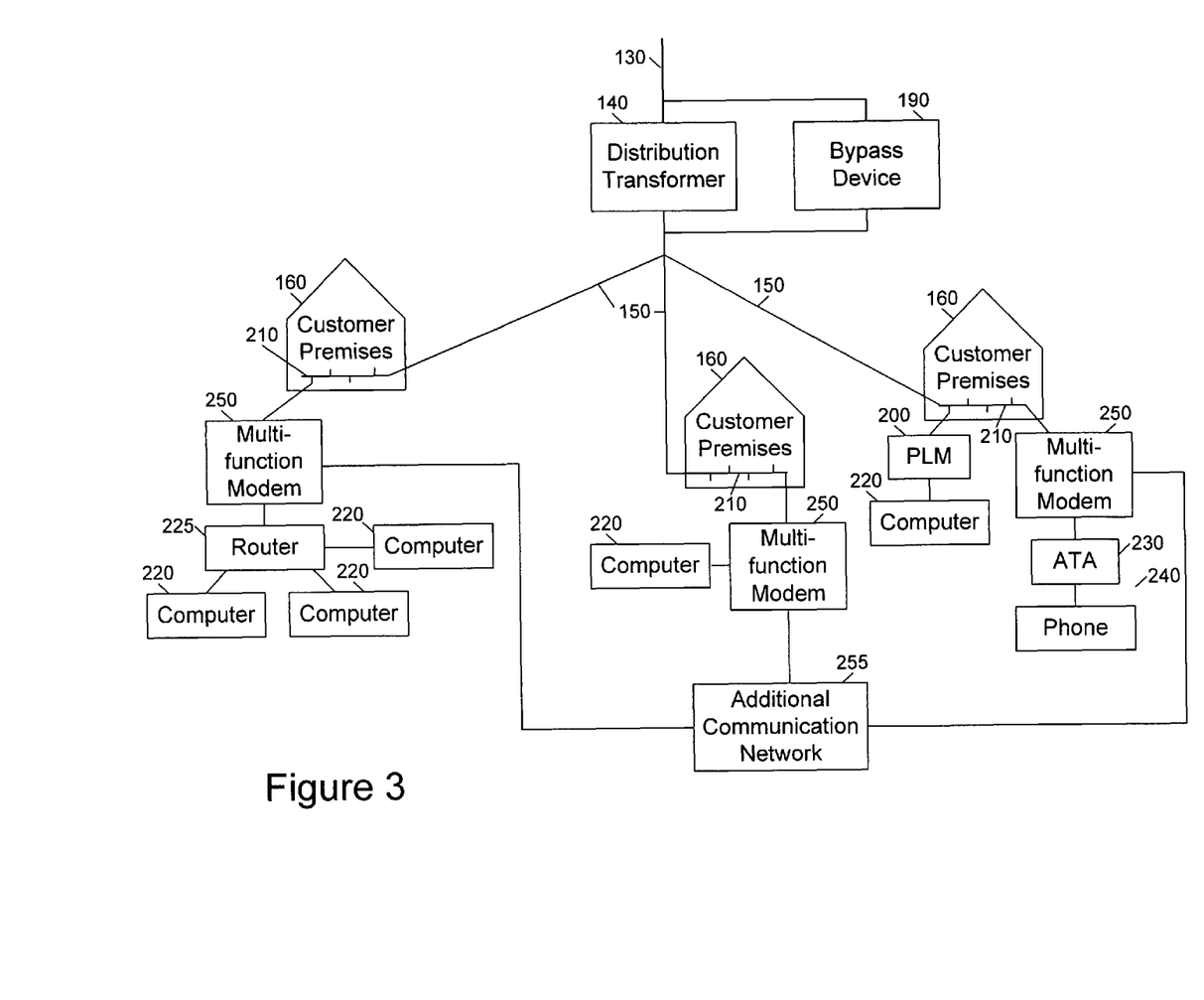
FIG. 3 shows an LV subnet in a PLCS according to an embodiment of the present invention.

FIG. 3 shows an LV subnet in a PLCS according to an embodiment of the present invention. The LV subnet is like that found in FIG. 2, with the exception that some of the PLMs 200 have been replaced by multi-function modems 250. The multi-function modem 250 has the same functionality as the PLM 200 described above plus the ability to communicate with an additional communication network 255. This additional communication network 255 may be a DSL system, a cable system, a wireless system, etc. This link to an additional communication network may provide a user access to additional bandwidth, backup network connectivity in the case of an outage, and/or a better performance network connection (e.g., a lower latency communication link). Like the PLM 200, the multi-function modem 250 also may integrated into any of the user devices listed above.

Figure 4:
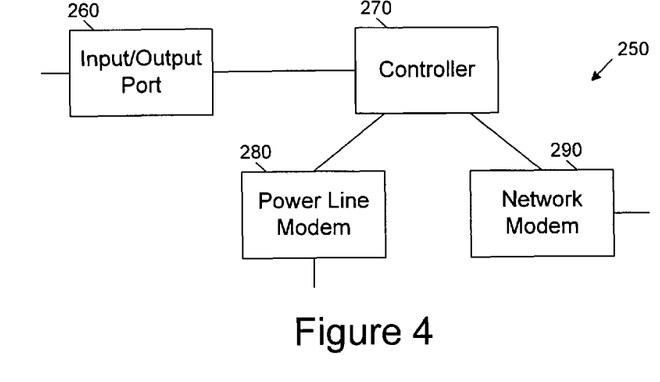
FIG. 4 is a diagram of a multi-function modem according to one embodiment of the present invention.

FIG. 4 is a diagram of a multi-function modem 250 according to one embodiment of the present invention. The multi-function modem 250 includes an input/output port 260, a controller 270, a power line modem 280, and a network modem 290.

The input/output port 260 interfaces with the user device in a manner substantially similar to the PLM 200 described above. This input/output port may use any of the following types of connectors: a RJ-11 Plain Old Telephone Service (POTS) connector, an RS-232 connector, a USB connector, an Ethernet 10 Base-T connector, RJ-45 connector, and the like.

The controller 270 is communicatively coupled to the input/output port 260 and receives data form and provides data to the input/output port 260. The controller 270 also is communicatively coupled to a power line modem 280 and a network modem 290. The controller 270 determines whether the incoming data from the input/output port 260 should be directed to the power line modem 280 or the network modem 290. Also, data input from either the power line modem 280 or the network modem 290 is received by the controller 270, and the controller 270 may supply this modem data to the input/output port 260 to be outputted to the user device. In an alternate embodiment, the input/output port 260, controller 270, power line modem 280, and network modem 290 may share a bus, and data flows between the input/output port 260 and the power line modem 280 or network modem 290 according to the controller 270.

The power line modem 280 may be connected to the controller (directly or through other components) and may be the same device (e.g., chip set) that might be used in a PLM 200. The power line modem also is connected to the in premises LV line 210. The power line modem 280 receives and transmits data signals via the in premises LV power line 210.

The network modem 290 may be connected to the controller 270 (directly or through other components). The network modem 290 may be a cable modem, a DSL modem, or any other type of modem or interface device that may be communicatively coupled to a communication network. The network modem 290 may be physically connected to the additional network 255 using a phone line for a DSL network or a coaxial cable for a cable network system.

Figure 5:
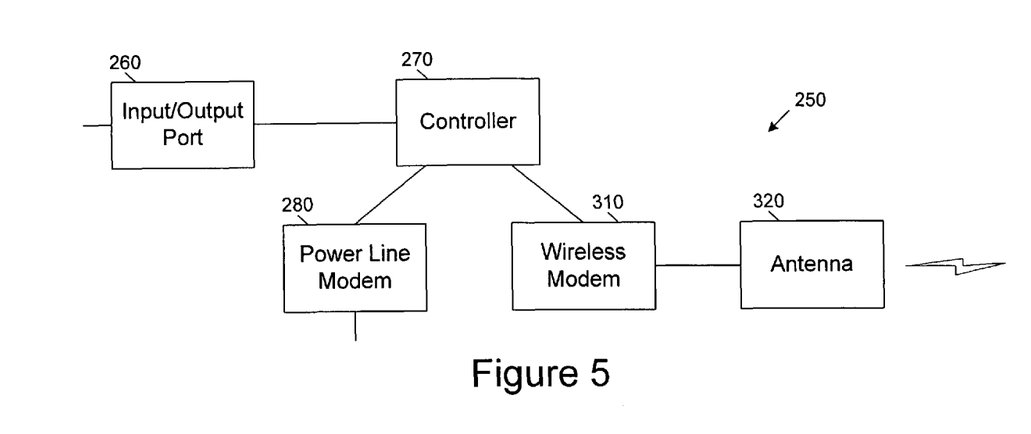
FIG. 5 is a diagram of a multi-function modem according to another embodiment of the present invention.

FIG. 5 is a functional diagram of a multi-function modem 250 according to another embodiment of the present invention. The multi-function modem 250 includes an input/output port 260, a controller 270, a power line modem 280, a wireless modem 310, and an antenna 320. The multi-function modem 250 of FIG. 5 may substantially similar to that in the embodiment of FIG. 4. In this example, the network modem 290 may include a wireless modem 310 and an antenna 320. The wireless modem 310 and antenna 320 provide a wireless link with the internet. The wireless link may use either a licensed or an unlicensed frequency band. As an example, the wireless modem may be a IEEE 802.11(a, b, or g) compliant modem or an IEEE 802.16 compliant modem. The wireless modem may employ any of the 900 Mhz, 2.4 Ghz, or 5.8 Ghz bands. In addition, or instead of providing broadband access, the wireless modem 310 and antenna 320 may facilitate a local area wireless network for communication with various user devices. In an alternate embodiment, the input/output port 260, controller 270, power line modem 280, and wireless modem 310 may share a bus, and data flows between the input/output port 260 and the power line modem 280 or wireless modem 310 according to the controller 270.

The multi-function modem 250 has various modes of operation that will now be described. For the purposes of example only, the following description illustrates use of the embodiment of FIG. 4 wherein DSL is the network service. Therefore, the network modem 290 of this example is a DSL modem. A user may plug in the multi-function modem 250 to an in premises LV power line 210 socket to thereby connect the power line modem 280 to the internal LV power lines. The user may also connect the device to the DSL cable to thereby connect the network modem 290 to the DSL network. Also, the user connects a computer or other data device to the input/output port 260. The user now has connectivity to the Internet and other external networks via two different paths: through a PLCS via the power line modem 280; and through a DSL network (which may be through a phone system). This dual connect may provide the user with more bandwidth than either system could provide on its own. Further, if either the PLCS or DSL system has an outage, the other system may then continue to provide uninterrupted service to the user. Thus, the system may require battery backup. The controller 270 determines how the data from the user is sent over the power line modem 280 and the DSL modem. It may be on a packet by packet basis to most fully utilize the total bandwidth available. The controller may also generally route all of the data first to one modem, and only use the second modem when the first modem cannot accommodate additional data traffic. Also, the controller 270 may group packets directed to the same location together and send that group of packets together through a single modem. It may also be desirable for the controller to differentiate different types of traffic based upon various data characteristics and send packets of one type through one modem or the other. For example, if it is known that the PLCS has a lower latency, the voice traffic may be sent only over the PLCS. Other criteria may be used to differentiate the data traffic as well. For example, it may be desirable to route the packets based on the data packet sizes. If this is the case, larger packets may be sent via one modem and smaller packets (such as gaming packets) may be sent via the other modem. The controller 270 would have the capability to route the data packets to either system according the various scenarios described above.

In another variation of the present invention, the multi-function modem 250 may operate to have the PLCS act as a backup network system when the additional network system 255 has an outage or vice versa. The controller 270 may detect the outage of the additional network system 255, and then automatically start routing data traffic through the PLCS. The network modem 290 may provide an indication to the controller 270 that a network outage has occurred using various methods well known in the art. Also, the controller 270 may determine that the network modem 290 is not working properly also due to an outage. This may be done by detecting a lack of signal or data from the network modem 290, or any other methods well known in the art. Once the outage is identified, the controller 270 routs all data traffic through the power line modem 280 to the PLCS. The controller may continue to monitor the outage of the additional network system 255, and once the network is again available, begin using the additional network 255 to transmit and receive data. Such a service could be offered to users at a nominal cost so that the user can nearly eliminate the possibility of a connection outage. Such cost may be a fixed monthly charge, charges based upon time used, amount of data transmitted, or some combination thereof. As mentioned above, the additional network system 255 may act as a backup of the PLCS as described above.

The multi-function modem 250 of FIG. 5 with the wireless capability may operate as described above. In this case, the wireless link provides a link to the Internet or some other external network.

In another embodiment of the present invention, the multi-function modem 250 may use the wireless link to communicate with a bypass device 190 or even a backhaul point 170. The controller 270 may decide to send traffic via the LV power line 150 or the wireless link using the substantially the same criteria described above. Also, if communications via the LV power line 150 are slow due to traffic from other premises 160 on the same LV power line subnet, data traffic may be sent over the wireless link.

In another embodiment of the present invention, the network modem 290 of FIG. 4 may be directly connected to the bypass device 190 using, for example, coaxial cable, Ethernet, twisted pair, or a fiber optic cable. This example may operate and provide the functionality of the embodiment described above wherein the wireless modem communicates with the bypass device 190.

The controller 270 typically will include software running on a processor. Such software may provide the various functionality described above in routing the data traffic to the different network systems, detecting outages, and detecting slow communications. All of these different modes of operation may be implemented by the software in the controller 270. The different modes may be selected and set at the time of manufacture, be user selectable, be automatically selected based upon input data from the network systems, or be downloaded over the PLCS or additional network for storage in the controller. Also, the controller 270 may collect network statistics to determine the capability of the power line modem 280 and network modem 290 and their associated networks. For example, a bandwidth or latency test may be done. This test may be done periodically or only once. Also, the controller 270 may receive such performance data regarding the modems and their associated networks from the modems, the PLS, or other external entities with such knowledge. Thus, when the data rate and/or latency of the network connected to a first modem falls below a predetermined threshold, the controller 270 may route traffic, or select data packets, to the other modem. Alternately, when the data rate of either network increases above a threshold (or latency of a network decreases), or increases a percentage above the other network, the controller 270 may route traffic through the modem (e.g., a wireless, cable, power line, or DSL modem) associated with that network. Thus, the controller 270 may periodically test each network by transmitting a ping or via other methods well known in the art. In addition, the controllers herein may route traffic according to one or more commands received form a power line network communications device (e.g., a bypass device) or a network communications device.

Figure 6:
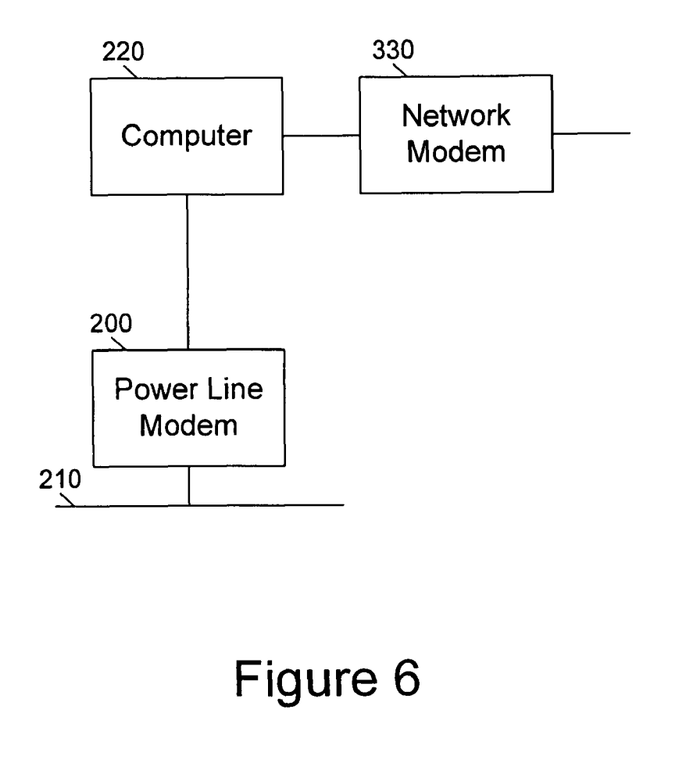
FIG. 6 shows another embodiment of the present invention.

FIG. 6 shows another embodiment of the present invention. In FIG. 6 a computer 220 is connected to a PLCS via PLM 200 and also to additional network system 255 via network modem 330. The network modem 330 may connect to a DSL, cable, or additional network system 255 as discussed above. The computer 220 has software installed therein that controls the output network data flow to the PLM 200 and the network modem 330. The software may control the flow of data to the two different network systems as described above in relation to the multi-function modem 250. As a result the same functionality as described above with respect to the multi-function modem 250 may be achieved with the system of FIG. 6. For example, data routing may be based upon some data characteristic, network performance capability, or software application communicating the data, or one network system may only provide a backup network in the case of an outage on the primary network.

Figure 7:
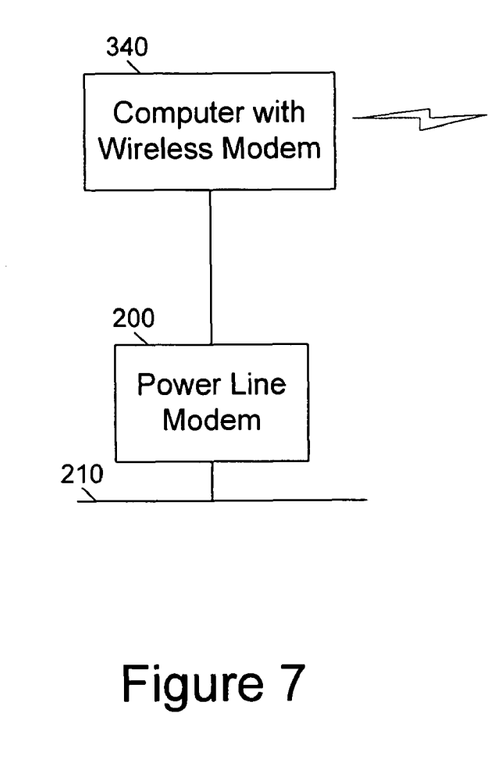
FIG. 7 shows another embodiment of the present invention.

FIG. 7 shows another embodiment of the present invention. In FIG. 7 a computer with a wireless capability is connected to a wireless network and to a PLCS via a PLM 200. Software installed on the computer allows the system to function like the system described in FIGS. 5 and 6 wherein a wireless link communicates with a wireless network, a bypass device 190, or a backhaul point 170.

In another embodiment of the present invention, the multi-function modem 250 may include a DSL modem and cable modem (instead of a power line modem 280 and a network modem 290). This example may allow for the same functionality as described above where, for example, both modems may be used to transmit data, or one modem may provide a backup capability to the other modem.

Figure 8:
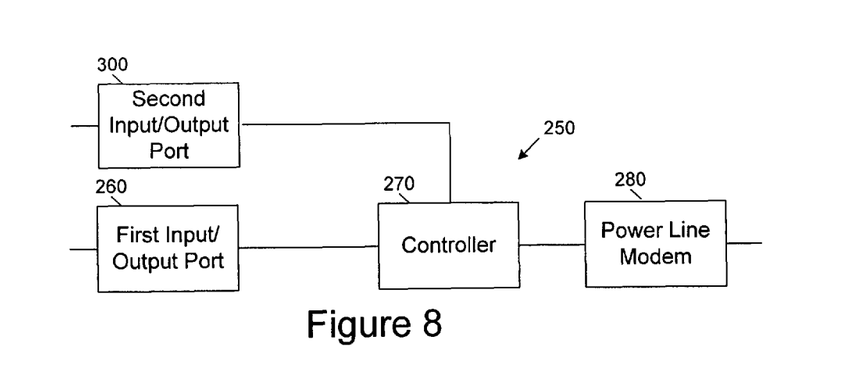
FIG. 8, illustrates still another embodiment of the present invention.

FIG. 8 shows another embodiment of a multi-function modem 250 according to the present invention. The multi-function modem 250 includes first and second input/output ports 260, 300, a controller 270, and a power line modem 280. The controller 270 may communicate with the power line modem 280 as described above. The power line modem 280 connects to a LV power line 210 and transmits and receives data from the LV power line 210. The controller 270 then transmits the data from the power line modem 210 to both the first input/output port 260 and the second input/output port 300. The data transmitted to the two input/output ports may be identical. The first and second input/output ports may be different types of ports. For example, one input/output port may be a category 5 type Ethernet port and the second input/output port may be a coaxial cable port. The input/output ports may be other types of ports as well. Such a multi-function modem 250 may be used, for example, in a user premises that has both Ethernet and coaxial cable installed. The multi-function modem 250 may transmit the data signal from the power line modem 280 along both cables allowing more of the premises to be served with a network connection. Alternately, data to the two input/output ports may be routed as well. For example, video data received via either the PLM 280 may be routed to the first input/output port (e.g., a coaxial cable port) and VoIP data may be routed to the second input/output port (e.g., to a VoIP telephone).

Figure 9:
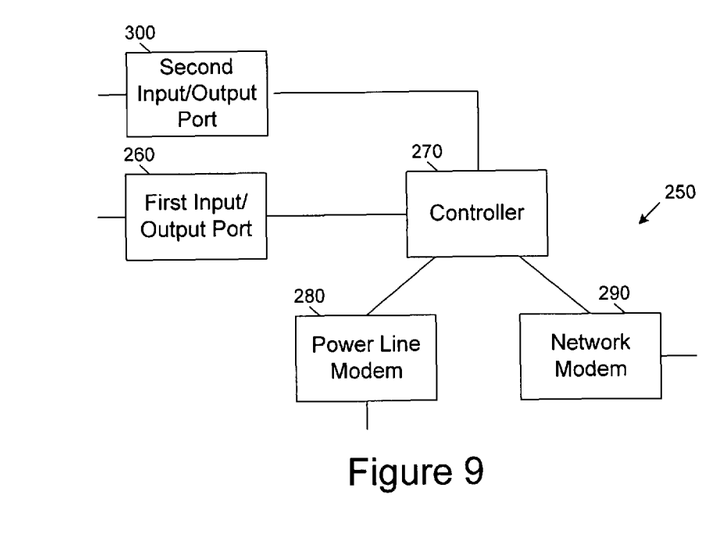
FIG. 9 depicts still another embodiment of the present invention.

FIG. 9 shows another embodiment of a multi-function modem 250 according to the present invention. The multi-function modem 250 includes first and second input/output ports, a controller 270, a power line modem 280, and a network modem 290. This embodiment is similar to that of FIG. 8, but adds the network modem 290 for a configuration similar to that of FIG. 4. In this embodiment, the controller 270 and the input/output ports may be as described with respect to the embodiment of FIG. 8. Also, in this embodiment the controller may determine where to route data from the power line modem 280, network modem 290, or both as described above with respect to FIG. 4. Similarly, the controller may determine where to route data from the first and second input/output ports 260, 300 (e.g., based on destination, packet size, type of packet, network availability, communication rates, and/or latency, etc.). The controller 270 may also dedicate the data received from the power line modem 280 to one input/output port and the data received from the network modem to the other input/output port.

Figure 10:
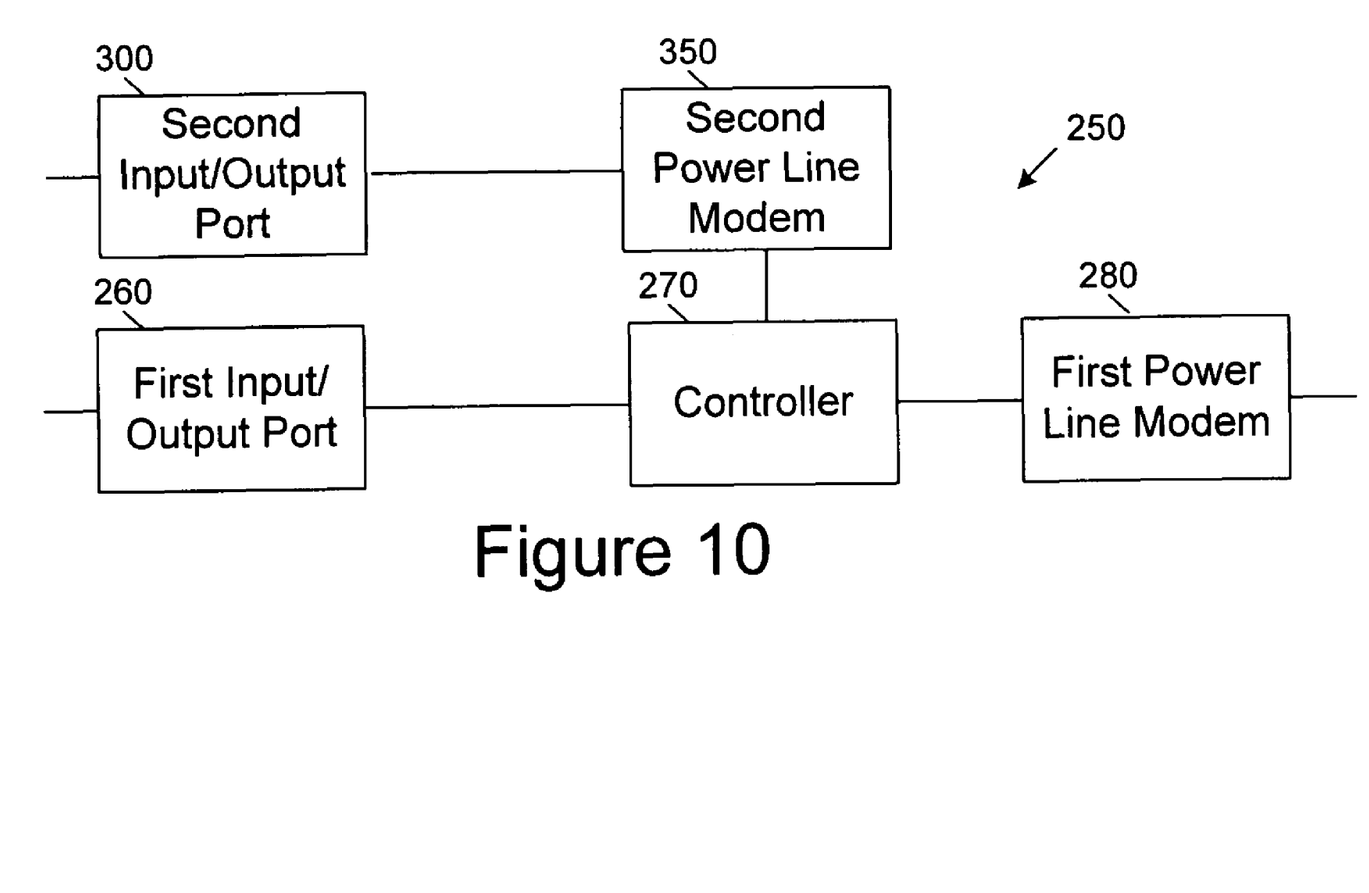
FIG. 10, illustrates yet another embodiment of the present invention.

FIG. 10 shows another embodiment of a multi-function modem 250 according to the present invention. The multi-function modem 250 includes first and second input/output ports 260, 300, a controller 270, and first and second power line modems 280, 350. The controller 270 communicates with the power line modem 280 as described above. The controller transmits data to both the first input/output port 260 and the second power line modem 350. The second power line modem 350 takes the data from the controller 270 and modulates the data on a carrier signal with a carrier frequency that may different from (or the same as) a carrier frequency used by the first power line modem 280. The second input/output port carries the modulated data signal from the second power line modem 350 to a communication medium such as a coaxial cable or other cable or wire capable of transmitting the data signal that may also be shared with another network. Thus, the second input/output port may be connected to the internal coaxial cable or telephone network and communicate in a frequency band that does not overlap, or overlaps only partially, with the signals communicated by the other network. The first input/output port 260 may by any type of port as discussed above.

In still another embodiment, not shown, the invention may comprise those components shown in FIG. 9, but instead of the second input/output port 300 the device may include a wireless modem (or wireless router) that communicates with user devices connected to the wireless local area network. Finally, as will be evident to those skilled in the art, in some embodiments and/or applications of the present invention, the controller may function as, be replaced with, or form part of a router.

It is to be understood that the foregoing illustrative embodiments have been provided merely for the purpose of explanation and are in no way to be construed as limiting of the invention. Words used herein are words of description and illustration, rather than words of limitation. In addition, the advantages and objectives described herein may not be realized by each and every embodiment practicing the present invention. Further, although the invention has been described herein with reference to particular structure, materials and/or embodiments, the invention is not intended to be limited to the particulars disclosed herein. Rather, the invention extends to all functionally equivalent structures, methods and uses, such as are within the scope of the appended Those skilled in the art, having the benefit of the teachings of this specification, may affect numerous modifications thereto and changes may be made without departing from the scope and spirit of the invention.

What is claimed is:

1. A communications device, comprising: a first port that is configured to be directly electrically connected to a user device; wherein said first port is configured to transmit data that is not modulated to a user device connected to said first port; wherein said first port is configured to receive data that is not modulated from a user device connected to said first port; a controller connected to the first port; a first modem comprising a power line modem connected to the controller; a second modem comprising a non-power line modem connected to the controller; wherein said second modem is configured to provide Internet communications via an external network; a non-power line port communicatively coupled to said second modem and configured to be electrically connected to a non-power line network to provide data from said second modem to the non-power line network; wherein said controller is configured to receive configuration data from an external network via said second modem, wherein said controller is configured to store the received configuration data in a memory; wherein said controller is configured to operate in accordance with said configuration data; wherein said controller selects one of the power line modem and the non-power line modem for transmission of data; and wherein said controller is configured to receive data via said first port and to provide the data to the one selected modem for transmission.

2. The communications device of claim 1, wherein the non-power line modem comprises a cable modem.

3. The communications device of claim 1, wherein the non-power line modem comprises a DSL modem.

4. The communications device of claim 1, further comprising a wireless modem in communication with said controller.

5. The communications device of claim 4, further comprising an antenna in communication with the wireless modem.

6. The communications device of claim 4, wherein the wireless modem communicates with a wireless network.

7. The communications device of claim 4, wherein the wireless modem communicates with a power line communications device coupled to a medium voltage power line.

8. The communications device of claim 4, wherein the wireless modem communicates with a backhaul point.

9. The communications device of claim 1, wherein if the controller is unable to communicate data via the non-power line modem, the controller communicates data via the power line modem.

10. The communications device of claim 1, wherein the controller sends and receives data from the power line modem and if the power line modem is unable to communicate data, then the controller sends and receives data from the non-power line modem.

11. The communications device of claim 1, wherein the controller selects and transmits certain types of data over one of the power line modem and the non-power line modem.

12. The communications device of claim 11, wherein the certain types of data comprises latency sensitive data.

13. The communications device of claim 12, wherein the latency sensitive data comprises voice data.

14. The communications device of claim 11, wherein the controller determines which of the power line modem and non-power line modem is able to transmit a higher data rate and the controller transmits data using the modem with the higher rate.

15. The communication device of claim 1, wherein the communication device communicates with a bypass device coupled to a medium voltage power line and a low voltage power line; and wherein the bypass is in communication with a backhaul point coupled to a medium voltage power line.

16. The communications device of claim 1, further comprising:
a second port that is connected to the controller and configured to be directly electrically connected to a user device;
wherein said second port is configured to transmit data that is not modulated to a user device connected to said second port; and
wherein said second port is configured to receive data that is not modulated from a user device connected to said second port.

17. The communication device of claim 16, wherein the power line modem is configured to communicate modulated data signals over an external network that comprises external power lines.

18. The communications device of claim 17, wherein the first port is an Ethernet port and the second port is a coaxial cable port.

19. The communications device of claim 17, wherein the first port is an universal serial bus port and the second port is a coaxial cable port.

20. The communications device of claim 1, further comprising:
a third port connected to said routing device and configured to be directly electrically connected to a user device;
wherein said third port is configured to transmit data that is not modulated to a user device connected to said third port; and
wherein said third port is configured to receive data that is not modulated from a user device connected to said third port.

21. The device according to claim 1, wherein said controller is configured to perform a latency test via said second modem.

22. The device according to claim 1, wherein said controller is configured to provide a bandwidth assessment via said second modem.

23. A method of using a communication device to communicate data, comprising:
receiving configuration data from an external network via a non-power line modem;
storing the configuration data in a memory;
providing data communications in accordance with the configuration data;
receiving user data at a first port from a user device directly electrically connected to the first port;
wherein the user data received is not modulated data;
selecting one of a power line modem configured to communicate over a power line or the non-power line modem configured to communicate over a non-power line medium;
providing the user data to the selected modem; and
transmitting the user data with the selected modem over an external network.

24. The method of claim 23, wherein the non-power line modem comprises a cable modem.

25. The method of claim 23, wherein the non-power line modem comprises a DSL modem.

26. The method of claim 23, wherein the non-power line modem comprises a wireless modem.

27. The method of claim 26, wherein the wireless modem communicates with a wireless network.

28. The method of claim 26, wherein the wireless modem communicates with a bypass device.

29. The method of claim 26, wherein the wireless modem communicates with a backhaul point.

30. The method of claim 23, wherein said selecting includes selecting the non-power line modem when a network communication channel satisfies a predetermined performance condition and selecting the power line modem when the network communication channel does not satisfy the predetermined performance condition.

31. The method of claim 23, wherein said selecting includes selecting the power line modem when a power line communication channel satisfies a predetermined performance condition and selecting the non-power line modem when the power line communication channel does not satisfy the predetermined performance condition.

32. The method of claim 23, further comprising:
determining a performance characteristic of a power line communications channel coupled to the power line modem and of a network communications channel coupled to the non-power line modem; and
wherein said selecting a modem is based upon the performance characteristic.

33. The method of claim 32, wherein the performance characteristic is data latency.

34. The method of claim 32, wherein the performance characteristic is data rate.

35. The method of claim 23, wherein the user data includes data packets and receiving, selecting, and transmitting are performed for each data packet.

36. The method of claim 23, wherein the device comprises a multipurpose computer.

37. The method of claim 36, wherein the step of receiving user data from a user device includes receiving data from an input device communicating with the multi-purpose computer.

38. The method of claim 23, further comprising:
receiving second user data at a second port from a user device directly electrically connected to the second port; wherein the second user data received is not modulated data;
selecting one of the power line modem or the non-power line modem;
providing the second user data to the selected modem; and
transmitting the second user data with the selected modem.

39. A communications device, comprising:
a first port that is configured to be directly electrically connected to a user device;
wherein said first port is configured to transmit data that is not modulated to a user device connected to said first port;
wherein said first port is configured to receive data that is not modulated from a user device connected to said first port;
a routing device connected to the first port;
a power line modem connected to the routing device;
a non-power line modem connected to the routing device;
wherein said non-power line modem is configured to provide Internet communications via an external network;
a second port communicatively coupled to said non-power line modem and configured to be electrically connected to a non-power line network to provide data from said non-power line modem to the non-power line network;
a wireless modem connected to the routing device;
wherein said routing device is configured to receive configuration data from an external network via said non-power line modem,
wherein said routing device is configured to store the received configuration data in a memory;
wherein said routing device is configured to operate in accordance with said configuration data; and
wherein said routing device is configured to route data from between the first port; the power line modem, the non-power line modem, and the wireless modem.

* * * * *